(12) United States Patent
Schmierer

(10) Patent No.: US 9,796,333 B2
(45) Date of Patent: Oct. 24, 2017

(54) SEALED MIRROR HEAD

(71) Applicant: SMR Patents S.à.r.l., Le Dôme (LU)

(72) Inventor: Arne Schmierer, Kirchheim (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/000,754

(22) Filed: Jan. 19, 2016

(65) Prior Publication Data

US 2016/0129841 A1  May 12, 2016

Related U.S. Application Data

(62) Division of application No. 14/022,896, filed on Sep. 10, 2013, now abandoned.

(30) Foreign Application Priority Data

Sep. 11, 2012  (DE) .................. 10 2012 108 480

(51) Int. Cl.
| | |
|---|---|
| *B60R 1/06* | (2006.01) |
| *B60R 1/02* | (2006.01) |
| *B60R 1/12* | (2006.01) |
| *B60Q 1/26* | (2006.01) |
| *F21S 8/10* | (2006.01) |
| *B60R 1/04* | (2006.01) |

(52) U.S. Cl.
CPC .............. *B60R 1/06* (2013.01); *B60Q 1/2665* (2013.01); *B60R 1/02* (2013.01); *B60R 1/12* (2013.01); *B60R 1/1207* (2013.01); *F21S 48/337* (2013.01); *B60R 1/04* (2013.01); *B60R 2001/1253* (2013.01); *B60R 2300/20* (2013.01); *B60R 2300/8026* (2013.01)

(58) Field of Classification Search
CPC ........... B60R 1/1207; B60R 1/04; B60R 1/06; B60Q 1/2665; B60Q 3/023
See application file for complete search history.

(56) References Cited

U.S. PATENT DOCUMENTS

| | | | | |
|---|---|---|---|---|
| 5,923,027 A | * | 7/1999 | Stam ..................... | B60S 1/0822 15/DIG. 15 |
| 6,139,171 A | | 10/2000 | Waldmann | |
| 6,168,277 B1 | * | 1/2001 | Kanazawa ............. | B60R 1/086 359/603 |
| 6,170,956 B1 | * | 1/2001 | Rumsey ............... | B60Q 1/2665 359/603 |

(Continued)

FOREIGN PATENT DOCUMENTS

| | | |
|---|---|---|
| DE | 94 09 566 U1 | 8/1994 |
| DE | 10 2009 020 402 A1 | 8/2009 |

(Continued)

*Primary Examiner* — Eret McNichols
(74) *Attorney, Agent, or Firm* — Jones Day

(57) ABSTRACT

A head section for a rear view device such as an internal or external mirror, for a motor vehicle that includes at least one housing section having a lid section arranged on a side of the housing section which faces away from the direction of driving of the motor vehicle, at least one electronic unit arranged in a hollow area formed between the housing section and the lid section, and at least one rear view means arranged on the lid section for displaying a side or rear area of the motor vehicle in relation to the direction of driving.

20 Claims, 3 Drawing Sheets

(56) References Cited

U.S. PATENT DOCUMENTS

| | | | |
|---|---|---|---|
| 6,195,194 B1* | 2/2001 | Roberts | B60R 1/088 359/265 |
| 6,650,457 B2* | 11/2003 | Busscher | B60Q 1/2665 359/265 |
| 7,042,616 B2* | 5/2006 | Tonar | B60Q 1/2665 257/E23.044 |
| 7,289,037 B2* | 10/2007 | Uken | B60K 35/00 340/425.5 |
| 7,324,261 B2* | 1/2008 | Tonar | C09K 9/02 359/265 |
| 7,488,099 B2 | 2/2009 | Fogg et al. | |
| 7,674,025 B2* | 3/2010 | Liesener | B29C 45/16 362/487 |
| 7,706,046 B2* | 4/2010 | Bauer | B60R 1/088 359/265 |
| 8,017,896 B2 | 9/2011 | Kikuchi | |
| 8,194,133 B2* | 6/2012 | DeWind | B60K 35/00 348/148 |
| 8,282,253 B2* | 10/2012 | Lynam | B60Q 1/2665 362/459 |
| 8,885,240 B2* | 11/2014 | Roth | B60R 1/02 359/267 |
| 8,976,439 B2* | 3/2015 | De Wind | B60R 1/04 359/245 |
| 2002/0032510 A1* | 3/2002 | Turnbull | B60R 1/12 701/49 |
| 2002/0159270 A1* | 10/2002 | Lynam | B60K 35/00 362/492 |
| 2003/0043589 A1* | 3/2003 | Blank | B60Q 1/2665 362/494 |
| 2003/0117728 A1* | 6/2003 | Hutzel | B60Q 3/023 359/838 |
| 2003/0169522 A1* | 9/2003 | Schofield | B60R 1/04 359/876 |
| 2003/0206417 A1* | 11/2003 | Pastrick | B60Q 1/2665 362/494 |
| 2004/0196661 A1* | 10/2004 | Lynam | B60Q 1/2665 362/494 |
| 2005/0052764 A1 | 3/2005 | Centmayer et al. | |
| 2005/0141230 A1* | 6/2005 | DeLine | B60Q 1/2665 362/494 |
| 2005/0195488 A1* | 9/2005 | McCabe | B60R 1/088 359/603 |
| 2005/0264891 A1* | 12/2005 | Uken | B60R 1/12 359/606 |
| 2006/0007550 A1* | 1/2006 | Tonar | B60R 1/088 359/604 |
| 2006/0061008 A1* | 3/2006 | Karner | B29C 45/0017 264/250 |
| 2008/0036230 A1* | 2/2008 | Dutton | B60Q 1/2665 296/1.11 |
| 2008/0212189 A1* | 9/2008 | Baur | B32B 17/10174 359/604 |
| 2009/0115631 A1* | 5/2009 | Foote | B60Q 1/2665 340/901 |
| 2009/0244707 A1* | 10/2009 | Kikuchi | B60R 1/088 359/601 |
| 2010/0182143 A1* | 7/2010 | Lynam | B60R 1/1207 340/465 |
| 2010/0321758 A1* | 12/2010 | Bugno | B60R 1/088 359/267 |
| 2011/0001428 A1* | 1/2011 | Rodriguez Barros | B60Q 1/2665 315/77 |
| 2011/0002028 A1* | 1/2011 | Luten | B60R 1/00 359/267 |
| 2011/0157907 A1* | 6/2011 | Hwang | B60R 1/1207 362/494 |
| 2011/0176323 A1* | 7/2011 | Skiver | B60R 1/12 362/494 |
| 2011/0181727 A1* | 7/2011 | Weller | B60R 1/12 348/148 |
| 2012/0014005 A1* | 1/2012 | Kliem | B60Q 1/2665 359/839 |
| 2012/0039082 A1* | 2/2012 | Rodriguez Barros | B60Q 1/2665 362/494 |
| 2012/0113660 A1* | 5/2012 | Ishikawa | B60Q 1/0088 362/494 |
| 2012/0236388 A1* | 9/2012 | DeWind | B60R 1/04 359/267 |
| 2013/0051047 A1* | 2/2013 | Endoh | B60R 1/06 362/494 |
| 2013/0107563 A1* | 5/2013 | McCabe | G02F 1/157 362/540 |
| 2013/0141931 A1* | 6/2013 | Mathieu | B60Q 1/34 362/516 |
| 2013/0170013 A1* | 7/2013 | Tonar | B60R 1/088 359/296 |
| 2014/0070068 A1* | 3/2014 | Schmierer | B60R 1/1207 248/466 |
| 2015/0085510 A1* | 3/2015 | Hellin Navarro | F21S 48/2287 362/511 |

FOREIGN PATENT DOCUMENTS

| | | | |
|---|---|---|---|
| WO | WO 2010124064 A1 * | 10/2010 | B60R 1/04 |
| WO | WO 2011/044312 | 4/2011 | |
| WO | WO 2012/051294 A1 | 4/2012 | |

* cited by examiner

SEALED MIRROR HEAD

This application is a divisional application of U.S. patent application Ser. No. 14/022,896, filed on Sep. 10, 2013, which claims priority to German Patent Application No. DE 10 2012 108 480.7, filed on Sep. 11, 2012, all of which are hereby incorporated by reference for all purposes in their entirety.

SUMMARY OF THE INVENTION

The embodiments of the present invention relate to a head section for a rear view device, such as an internal or external mirror, for a motor vehicle, with at least one housing section with a lid section which can be arranged or is arranged on a side of the housing section which faces away from or can be turned away from the direction of driving of the motor vehicle, with at least one electronic unit which can be arranged or is arranged in a hollow area which is formed between the housing section and the lid section, and with at least one rear view means which can be arranged or is arranged on the lid section for displaying a side and/or rear area of the motor vehicle in relation to the direction of driving. The embodiments of the present invention further relate to a rear view device and a motor vehicle with such a rear view device.

BACKGROUND OF THE INVENTION

Head sections for rear view devices, as well as rear view devices, are known. With these, a rear view means is arranged at least partially within a hollow area of the housing section, and can be adjusted manually or by motor relative to the housing section. Current head sections contain electronic components such as repeatedly flashing lights, lights for the immediate surrounding area, alarm signal devices etc. in the housing section. In order to protect the individual electronic components against penetration by dirt or humidity, they are each protected by a separate housing. In order to be able to arrange the electronic components with their housing in the head section, the head section must be sufficiently generous in its proportions, which makes a compact, and in particular aerodynamically optimized, design of the head section and the rear view device more difficult.

A generic head section for a rear view device is known from DE 10 2009 020 402 A1, in which a hollow area formed between the housing section and the lid section is freely accessible from outside.

A head section for a rear view device is known from DE 94 09 566 U1, in which an electronic unit can be arranged in a hollow area between the housing section and the lid section.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION OF THE INVENTION

Figure 1:
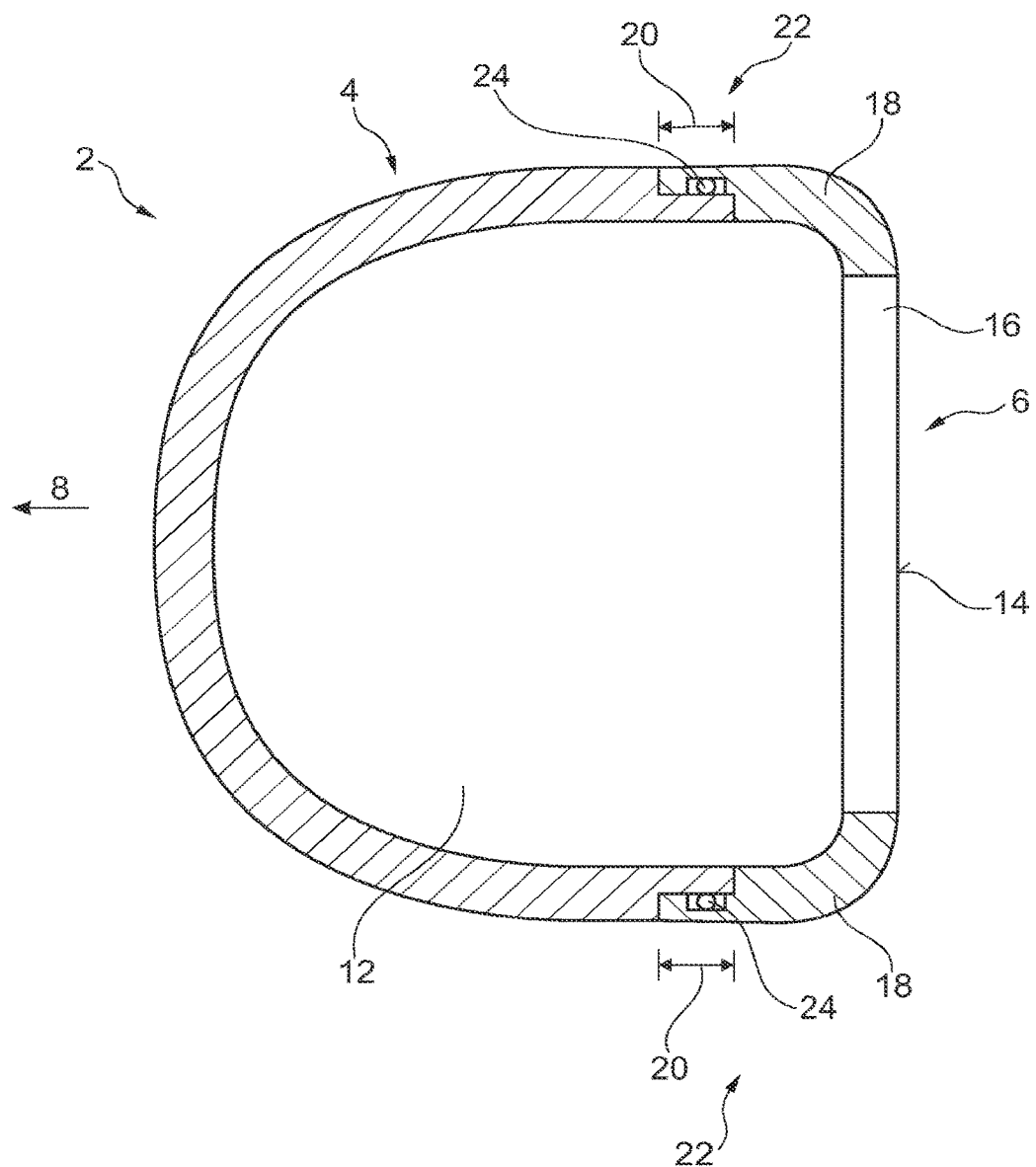
FIG. 1 shows a schematic profile view of a first exemplary embodiment of the head section according to the embodiments of the present invention.

The object of the invention is to provide a head section and a rear view device which can be designed in a compact manner.

This object is attained by a head section according to the invention by means of the fact that the housing section and the lid section tightly seal the hollow area towards the outside over at least almost the entire circumference.

Due to the fact that the hollow area is surrounded at least almost over its entire circumference towards the outside, the hollow area is protected against penetration by dirt and humidity. This makes it possible to arrange the at least one electronic unit in the hollow area without its own seal. This makes it possible to create a compact design for the head section.

In general, it is feasible to provide the electronic unit with its own housing, with which it can be arranged in the hollow area between the housing section and the lid section. However, it has been shown to be advantageous when the at least one electronic unit can be arranged or is arranged without housing in the hollow area.

The housing section and the lid section can in general be connected to each other in any manner required. With one embodiment of the head section according to the invention, it is provided that the housing section and the lid section can be locked or are locked relative to each other at a coupling portion in such a manner that they overlap each other, and in particular form an undercut. When the lid section and the housing section form an undercut, it is easily possible to achieve a fixed connection of the two components. In particular, in such cases, the housing section and the lid section can be locked to each other without using tools, e.g. by means of clips.

In general, it is feasible to create the coupling portion only in sections. Preferably, the coupling portion is designed to surround the circumference.

It is feasible to make the rear view means relatively mobile in relation to the housing section. This can be the case, for example, when the lid section and/or the housing section is created at least in sections from a flexible, pliable material, such as a plastic membrane. However, it has been shown to be advantageous when the rear view means is locked relative to the housing section. In such cases, the rear view means can be set by adjusting the head section.

The rear view means can comprise a component which can be separated or is separated from the lid section. In such cases, the lid section can for example be adhered, or locked for example by spraying a reflective coating on the lid section. In one embodiment of the head section according to the invention, it is provided, however, that the lid section and the rear view means comprise a single-piece component.

This makes it possible to reduce the number of components of the head section.

In general, it is feasible to create the lid section in a disc form. However, it has been shown to be advantageous when the lid section is designed as a type of clamp, and comprises a flat portion, which in particular comprises the rear view means, and at least one edge portion which extends transverse or diagonally to the flat portion. In such cases, the lid section can be locked to the housing section like a clamp with the at least one edge section. The edge section can here be adjacent to the housing section from the inside, or grips the housing section from the outside.

The housing section and the lid section can be created from any material required. When the lid section and the rear view means comprise a combined single-piece component, i.e. when the rear view means is part of the lid section, it has been shown to be advantageous when the lid section comprises a multiple-part component, wherein the flat portion comprises a first lid part, in particular a plastic part, and the edge portion comprises a second lid part, in particular a plastic part.

In general, it is feasible that the multiple-part component comprises a dual-part plastic section. When the lid section has several functions, however, further plastic parts can be provided.

Due to the fact that the edge section can comprise another plastic part, such as the flat portion, the edge section can be designed to form a tight seal. The electronic unit can comprise a lighting unit for example. The light from the head section generated by the lamp can penetrate outwards through the light window. In such cases, the electronic unit can comprise a repeatedly flashing light or lighting for the area immediately surrounding a motor vehicle.

With one embodiment of the head section according to the invention, it is provided that the housing section comprises a first housing part, in particular a plastic part, which lies directly on the hollow area and which has a coloring which is in particular essentially opaque and/or non-translucent, wherein the first housing part comprises an opening in the area of the light window. Due to the fact that the first housing component is opaque and non-translucent, an attractive appearance can be achieved. Due to the fact that an opening is provided in the first housing part, the light from the electronic unit can penetrate outwards.

In order to prevent penetration by dirt or humidity, with a further development of the latter inventive embodiment, it is provided that an optical element, such as an optical fiber and/or light disc, can be arranged in the and/or on the opening of the first housing part of the housing section and that a housing seal can be arranged or is arranged between the first housing part of the housing section and the optical element. Due to the provision of the housing seal between the optical element and the opening of the housing section, the hollow area is tightly sealed towards the outside. As a result, again, no separate housing is required for the electronic unit.

As a supplement or an alternative to the provision of a housing seal, it has been shown to be advantageous when a second housing part, in particular a plastic part, is arranged in such a manner that it lies on a surface of the first housing part which faces away from the hollow area, and is essentially translucent and/or transparent at least in the area of the light window, and in particular in the area of the light window is designed as an optical element such as an optical fiber and/or light disc.

Due to the fact that a second housing part is adjacent to the first housing part, which in particular covers the opening provided in the first housing part towards the outside, no housing seal is required. Due to the fact that the second housing part is translucent and/or transparent, light from the electronic unit which is designed as a lighting unit can penetrate outwards from the hollow area of the head section.

The rear view means can comprise a reflective means and/or a display means such as a screen, in particular an LED or LCD screen. When the display means comprises a screen, the screen can be arranged on the flat portion of the lid section. It is furthermore feasible that the lid section, at least in the portion on which the LED or LCD screen is arranged, is arranged in a transparent and/or translucent manner, and the screen is arranged on the side of the flat portion of the lid section which faces towards the hollow area.

The electronic unit can comprise a setting facility for the rear view device. This makes it possible to set the rear view device in a simple manner. The setting facility can be arranged on the upper surface of the flat portion of the lid section which faces towards the hollow area.

It has been shown to be advantageous when the setting facility comprises a setting unit with at least one lighting means which can be locked or is locked relative to a rear view means, and by means of which a directable or directed light beam can be emitted, which is at least almost solely perceivable in a specified operating position by a driver of a motor vehicle and/or a control unit.

The lighting means can comprise a coiled wire bulb, an LED or a laser.

Due to the fact that the light beam can be detected at least almost solely in the specified operating position by a driver of a motor vehicle and/or by a control unit, the rear view means is easy to adjust in a position which conforms to the regulations.

In order to enable light to exit, it has been shown to be advantageous when the housing section and/or the lid section, in particular the edge portion comprises/comprise a transparent and/or translucent area through which the light beam emitted by the lighting means can penetrate outwards at least almost unimpeded.

This makes it possible for light which is emitted by the lighting means to penetrate outwards from inside the rear view device and to be perceivable from the outside, wherein in the hollow area of the housing, it is at the same time protected against environmental influences.

The transparent and/or translucent area can in general be designed in any manner required. It has been shown to be advantageous when the transparent and/or translucent area comprises a recess, in particular throughout, and/or a translucent and/or transparent material such as glass, in particular smoked glass, or plastic.

In general, it is feasible that the light beam emitted from the lighting means is sufficiently bundled in order to be perceivable almost solely in the specified operating position by the driver of a motor vehicle and/or the control unit. Furthermore, it has been shown to be advantageous when the setting unit comprises at least one optical element which can be functionally assigned or is assigned to the lighting means, with which the light beam emitted by the lighting means can at least be bundled.

Furthermore, the object is attained by means of a rear view device, such as an internal or external mirror, for a motor vehicle, with at least one head section, in particular with at least one of the features described above.

Finally, the object is attained by means of a motor vehicle with at least one rear view device with at least one of the features described above and/or with at least one head section, in particular with at least one of the features described above.

The head section according to the invention, the rear view device according to the invention and the motor vehicle according to the invention have been shown to be advantageous in many respects.

Due to the fact that the lid section and the housing section surround a hollow area in an almost entirely sealing manner, electronic devices can be provided in the hollow area which require no housing. As a result, the head section and the rear view device can be compact in design.

Further features, details and advantages of the invention are explained in the appended claims, in the drawings and in the description of a preferred embodiment of the head section according to the invention given below.

The figures show a head section for a rear view device which is overall assigned reference numeral 2. The head section 2 can for example comprise a mirror head of an internal or external mirror. The head section 2 comprises a housing section 4 and a lid section 6.

Figure 2:
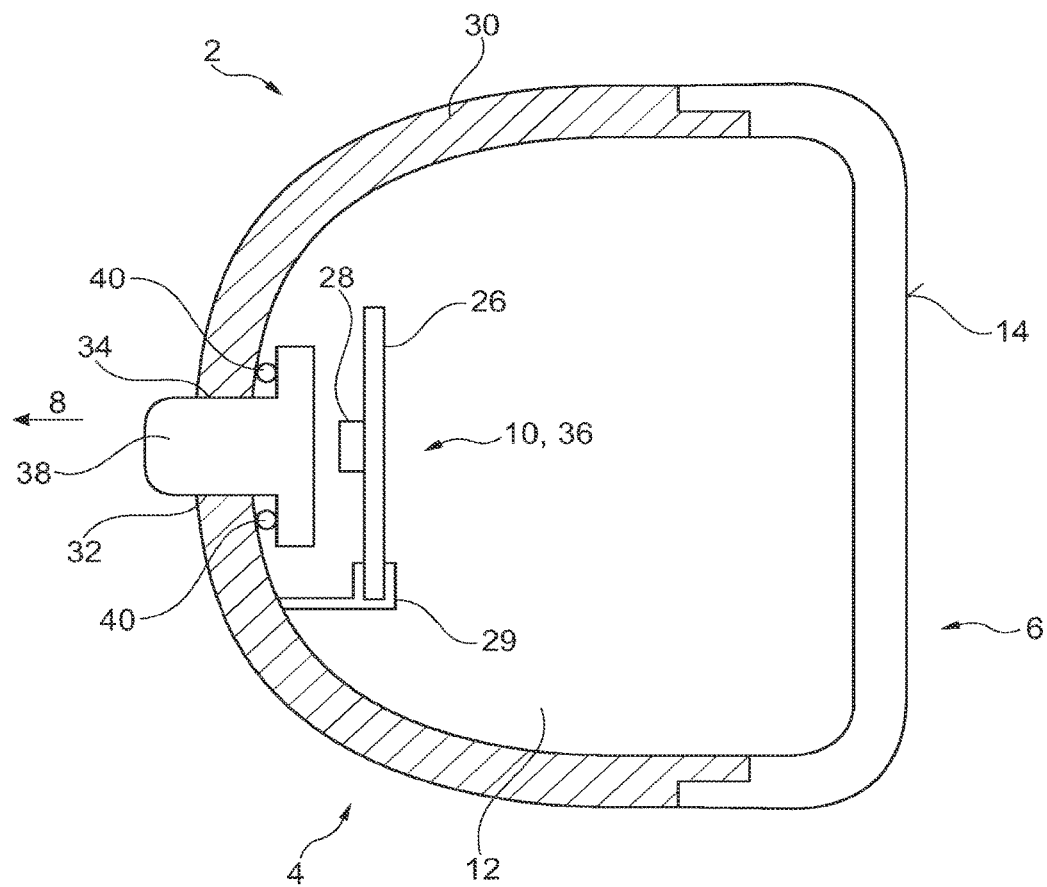
FIG. 2 shows a schematic profile view of a second exemplary embodiment of the head section according to the invention with an electronic unit arranged in the hollow area.
Figure 3:
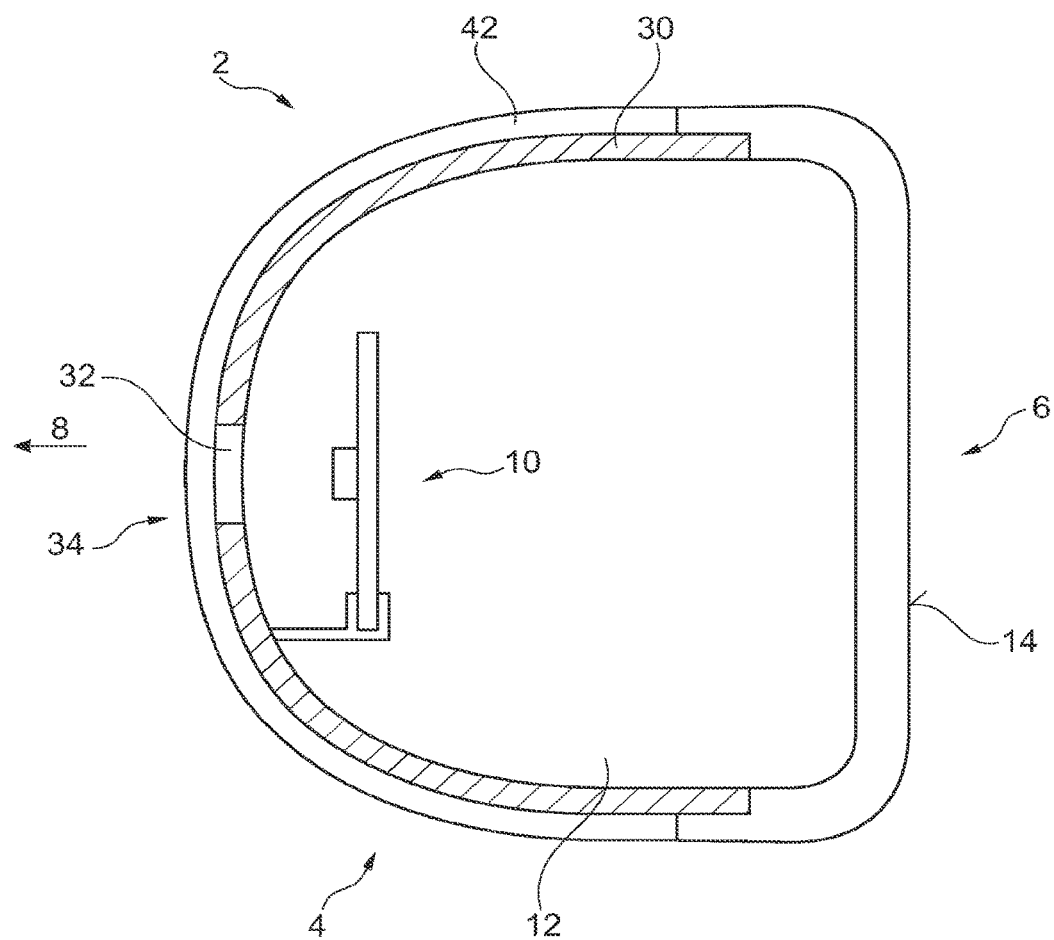
FIG. 3 shows a third exemplary embodiment of the head section according to the invention, with a housing section comprising two housing parts.

The figures show the head section 2 in a folded out operating position. In this position, the housing section 4 essentially faces towards the direction of driving 8, and the lid section 6 is essentially arranged facing away from the direction of driving 8. As can be seen in FIGS. 2 and 3, an electronic unit 10 can be arranged between the housing section 4 and the lid section 6. This can be locked in a hollow area 12 between the housing section 4 and the lid section 6.

With the exemplary embodiments shown in the figures, a rear view means 14 is arranged on the side of the lid section 6 which faces away from the hollow area 12, wherein the lid section 6 and the rear view means 14 comprise a combined component.

The lid section 6 and the housing section 4 surround the hollow area 12 over its full circumference and at least almost completely seal it tightly towards the outside. This makes it possible to arrange the electronic unit 10 without housing in the hollow area 12.

FIG. 1 shows a first exemplary embodiment in which the lid section 6 comprises a flat portion 16 and two edge portions 18 which extend diagonally to the flat portion 16. The lid section 6 comprises a multiple-part component which is designed as a dual-part injection molded element. Here, the flat portion 16 is formed from a first lid part and the two edge portions 18 are formed from a second lid part. The two edge portions 18 grip the housing section 4 from outside, wherein they overlap the housing section 4 in a coupling portion 20. Here, the edge portions 18 comprise a lid part which acts as a sealing means 22. Furthermore, the sealing means 22 additionally comprises a sealing element which is designed as an O-ring 24. It should be appreciated that the sealing means 22 and sealing element or O-ring 24 that is positioned between the lid section 6 and the housing section 4 may also be used in the second exemplary embodiment of FIG. 2 or the third exemplary embodiment of FIG. 3.

FIG. 2 shows a second exemplary embodiment of the head section 2 according to the invention. In this embodiment, an electronic unit 10 is arranged in the hollow area 12. In the exemplary embodiment shown in FIG. 2, the electronic unit 10 comprises a printed circuit board 26 and a lamp 28. In order to affix the printed circuit board 26 in the hollow area 12, a retaining device 28 is provided, which also rests on the housing section 4. In the exemplary embodiment shown in FIG. 2, the housing section is formed from a first housing part 30 which is opaque and non-translucent.

In order to enable light from the lamp 28 to penetrate outwards from the hollow area 12, the first housing part 30 of the housing section 4 comprises an opening 32. The opening 32 is part of a light window 34 which enables an outward penetration of light from the electronic unit 10 which comprises the printed circuit board 26 and the lamp 28 and is designed as a lighting unit 36. In order to achieve an attractive emission of light, an optical element 38 is provided which is arranged at the opening 32. The optical element 38 can comprise a light fiber and/or a light disc. In order to prevent the penetration of humidity and dirt, a housing seal 40 is arranged between the optical element 38 and the first housing part 30 of the housing section 4.

FIG. 3 shows a third exemplary embodiment of the head section 2 according to the invention, in which the housing section 4 comprises a second housing part 42, which is arranged on an outer side which faces away from the hollow area 12 of the first housing part 41. The second housing part 42 comprises a transparent and/or translucent area, at least in the area of the light window 34.

Due to the provision of a second housing part 42, no housing seal 40 is required according to FIG. 2.

The claims included in the above description and the features of the invention disclosed in the drawings can be essential both individually and in any combination required in the realization of the invention in its different embodiments.

The invention claimed is:

1. A head section for an exterior side and rear view mirror device for a motor vehicle comprising:
   at least one housing section comprising a first housing part and a second housing part, and having a curved lid section arranged on a side of the housing section which faces away from a driving direction of the motor vehicle;
   at least one electronic unit arranged in a hollow area formed between the housing section and the curved lid section;
   at least one rear view means arranged on the curved lid section for displaying a side or rear area of the motor vehicle in relation to the driving direction; and
   a sealing means which is disposed between and in contact with an entire circumference of a portion of the housing section and the curved lid section,
   wherein the sealing means, the housing section, and the curved lid section seal the hollow area of the exterior side and rear view mirror from an outside environment over an entire circumference of the hollow area, and
   wherein the curved lid section and the rear view means comprise a combined, single-piece component so that the rear view means extends along the curved lid section.

2. The head section according to claim 1, wherein the at least one electronic unit is arranged without housing in the hollow area.

3. The head section according to claim 1, wherein the housing section and the curved lid section are capable of being locked relative to each other at a coupling portion in such a manner that they overlap each other, and in particular form an undercut.

4. The head section according to claim 1, wherein the rear view means is capable of being locked relative to the housing section.

5. The head section according to claim 1, wherein the housing section, in particular on the side facing towards the driving direction includes at least one light window or the electronic unit has a lighting unit arranged in the hollow area and comprises at least one printed circuit board and at least one lamp.

6. The head section according to claim 5, wherein the first housing part of the housing section is a plastic part which is immediately adjacent to the hollow area and has a coloring which is in particular essentially opaque or non-translucent, and wherein the first housing part comprises an opening in the area of the light window.

7. The head section according to claim 5, wherein the second housing part of the housing section is a plastic part that is arranged in such a manner that the second housing part lies on a surface of the first housing part which faces away from the hollow area, and is essentially translucent or transparent in the area of the light window.

8. The head section according to claim 1, wherein the rear view means comprises a reflective means or a display means such as a screen, in particular an LED or LCD screen.

9. A rear view device for a motor vehicle with at least one head section according to claim 1.

10. A head section for an external side and rear view mirror device for a motor vehicle comprising:
   at least one housing section comprising a first housing part and a second housing part, and having a curved lid section arranged on a side of the housing section which faces away from a driving direction of the motor vehicle;
   at least one electronic unit arranged in a hollow area formed between the housing section and the curved lid section;
   at least one rear view means arranged on the curved lid section for displaying a side or rear area of the motor vehicle in relation to the driving direction; and
   a sealing means which is disposed between and in contact with an entire circumference of a portion of the first housing part and the curved lid section,
   wherein the sealing means, the housing section, and the curved lid section seal the hollow area of the exterior side and rear view mirror from an outside environment over an entire circumference of the hollow area,
   wherein the first housing part of the housing section is opaque or non-translucent and the second housing part of the housing section is translucent or transparent, and
   wherein the curved lid section and the rear view means comprise a combined, single-piece component so that the rear view means extends along the curved lid section.

11. The head section according to claim 10, wherein the at least one electronic unit is arranged without housing in the hollow area.

12. The head section according to claim 10, wherein the housing section and the curved lid section are capable of being locked relative to each other at a coupling portion in such a manner that they overlap each other, and in particular form an undercut.

13. The head section according to claim 10, wherein the rear view means is capable of being locked relative to the housing section.

14. The head section according to claim 10, wherein the housing section, in particular on the side facing towards the driving direction includes at least one light window or the electronic unit has a lighting unit arranged in the hollow area and comprises at least one printed circuit board and at least one lamp.

15. The head section according to claim 14, wherein the first housing part of the housing section is a plastic part which is immediately adjacent to the hollow area, and wherein the first housing part comprises an opening in the area of the light window.

16. The head section according to claim 14, wherein the second housing part of the housing section is a plastic part that is arranged in such a manner that the second housing part lies on a surface of the first housing part which faces away from the hollow area.

17. The head section according to claim 10, wherein the rear view means comprises a reflective means or a display means such as a screen, in particular an LED or LCD screen.

18. A head section for an exterior side and rear view mirror device for a motor vehicle comprising:
   at least one housing section comprising a first housing part and a second housing part, and having a curved lid section arranged on a side of the housing section which faces away from a driving direction of the motor vehicle;
   at least one electronic unit arranged in a hollow area formed between the housing section and the curved lid section;
   at least one rear view means arranged on the curved lid section for displaying a side or rear area of the motor vehicle in relation to the driving direction; and
   a sealing means which is disposed between and in contact with an entire circumference of a portion of the first housing part and the curved lid section,
   wherein the sealing means, the housing section, and the curved lid section seal the hollow area of the exterior side and rear view mirror from an outside environment over almost an entire circumference of the hollow area,
   wherein the housing section, in particular on the side facing towards the driving direction includes at least one light window,
   wherein the first housing part of the housing section is a plastic part which is immediately adjacent to the hollow area, and the first housing part comprises an opening in the area of the light window,
   wherein the second housing part of the housing section is a plastic part that is arranged in such a manner that the second housing part lies on a surface of the first housing part which faces away from the hollow area, and
   wherein the curved lid section and the rear view means comprise a combined, single-piece component so that the rear view means extends along the curved lid section.

19. The head section of claim 18, further comprising an O-ring which is positioned between the housing section and the curved lid section for sealing the hollow area from the outside environment.

20. A head section for an exterior side and rear view mirror device for a motor vehicle comprising:
   at least one housing section comprising a first housing part and a second housing part, and having a curved lid section arranged on a side of the housing section which faces away from a driving direction of the motor vehicle;
   at least one electronic unit arranged in a hollow area formed between the housing section and the curved lid section;
   at least one rear view means arranged on the curved lid section for displaying a side or rear area of the motor vehicle in relation to the driving direction; and
   an O-ring which is disposed between and in contact with an entire circumference of a portion of the housing section and the curved lid section, wherein the O-ring, the housing section, and the curved lid section seal the hollow area of the exterior side and rear view mirror from an outside environment over an entire circumference of the hollow area, and wherein the curved lid section and the rear view means comprise a combined, single-piece component so that the rear view means extends along the curved lid section.

\* \* \* \* \*